Aug. 25, 1959   J. V. BASILE   2,900,729
COMBINED LEVEL AND MEASURING TOOL
Filed Nov. 28, 1956
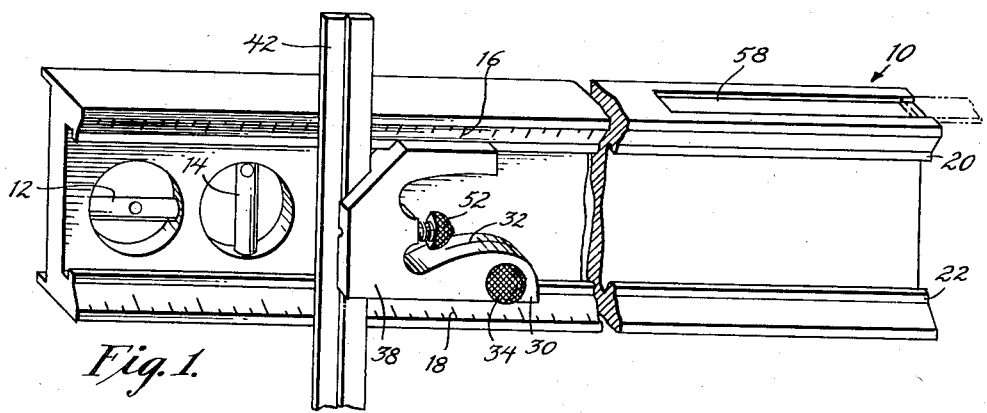
Fig. 1.
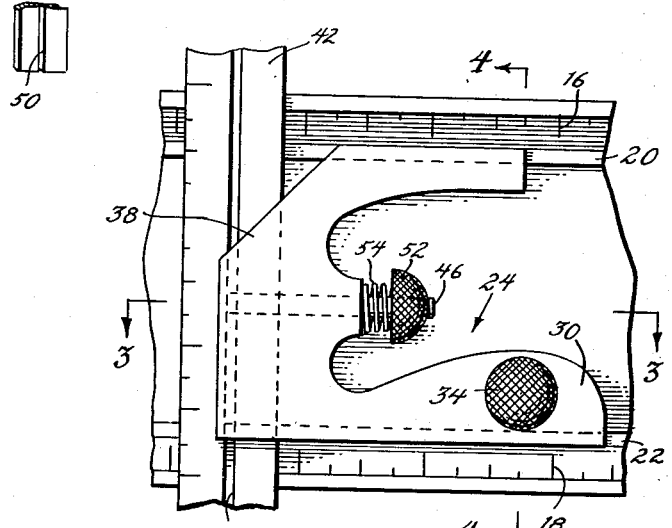
Fig. 2.
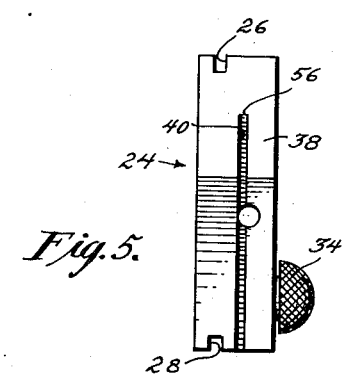
Fig. 4.
Fig. 5.
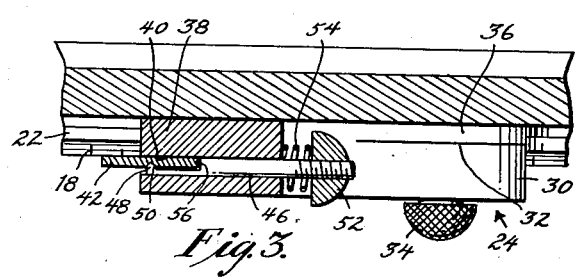
Fig. 3.
INVENTOR.
JAMES V. BASILE
BY Louis Necho
ATTORNEY.

United States Patent Office 2,900,729
Patented Aug. 25, 1959

2,900,729

COMBINED LEVEL AND MEASURING TOOL

James V. Basile, Philadelphia, Pa.

Application November 28, 1956, Serial No. 624,807

1 Claim. (Cl. 33—89)

My invention relates to a combined measuring and leveling tool which can measure and level in vertical and in horizontal planes either selectively or simultaneously.

The full nature of the invention will be understood from the following specification and the accompanying drawings in which:

Fig. 1 is a perspective view of a tool embodying my invention.

Fig. 2 is a fragmentary side elevational view of a portion of the tool showing details of construction.

Fig. 3 is a sectional view taken on line 3—3 on Fig. 2.

Fig. 4 is a sectional view taken on line 4—4 on Fig. 2.

Fig. 5 is a front elevational view of the movable carriage, the same being shown detached.

Referring to the drawings 10 designates a level body of the desired length, 12 designates a bubble for horizontal leveling and 14 designates a bubble for vertical leveling. The level body 10 is graduated as at 16 and 18 and is provided with upper and lower tracks 20 and 22 for guiding a carriage 24. Carriage 24 is provided with upper and lower grooves 26 and 28 for engaging tracks 20 and 22, slidably to mount the carriage on level body 10, as best shown in Fig. 4. To hold the carriage firmly in position relative to the level, the rear portion 30 of the carriage is split as at 32 to form an outer portion 33 and an inner portion 36 which are disposed on either side of the corresponding track. Outer portion 33 has a hole through which a screw 34 passes to engage a tapped hole in inner portion 36 firmly to clamp the carriage onto track 22. By loosening the set screw 34 the carriage may be moved, to and fro, relative to the level body 10.

The forward portion 38 of the carriage is provided with a slot 40 for slidably receiving a suitably graduated rule 42. Rule 42 is held in position by means of a spring loaded pin 46, the reduced end of which is provided with a projection 48 which engages a groove 50 in the outer side of the rule. Pin 46 is provided with a knob 52 and is biased outwardly, or to the right, as viewed in Fig. 3, by spring 54. The tension of spring 54 serves to pull rule 42 into frictional engagement with the inner wall 56 of slot 40 and the tension of spring 54 may be so calibrated, or may be so adjusted by rotation of knob 52, which threadedly engages pin 46, so that the pressure with which rule 42 engages inner wall 56 of slot 40 will be such as to prevent unintended movement of rule 42 but not such as to prevent intended movement of said rule. However, it is obvious that by applying pressure on knob 52, pin 46 will move slightly to the left as shown in Fig. 3 to permit free movement of rule 42 relative to the carriage.

Level body 10 is also preferably provided with a recess 58 for receiving a slide rule or other desired instrument, not shown.

It will be noted that the carriage, as a whole, is reversible so that it may be used from right to left or from left to right. Also, the calibrations 16 and 18 begin at opposite ends of the level so as to be easily read regardless of the direction in which the carriage is moved relative to the level.

I claim:

A combined level and measuring tool comprising an elongated body, a first track along an upper longitudinal edge of said body, a second track along a lower, longitudinal edge of said body, a carriage having oppositely facing grooves loosely engaging said tracks for slidably mounting said carriage on said body, said carriage having a slot therein extending transversely of said body, a rule freely movable in said slot, a pin passing through an opening in said carriage and engaged with said rule, a spring biasing said pin outwardly to bring said rule into frictional engagement with a wall of said slot to prevent free movement of said rule relative to said slot, a portion of said carriage which includes one of said grooves being slit longitudinally of said groove to form separated inner portions and outer portions, and a set screw passing through a hole in said outer portion and engaging a tapped hole in said inner portion to clamp said carriage onto said track.

References Cited in the file of this patent

UNITED STATES PATENTS

| | | |
|---|---|---|
| 426,001 | Evans | Apr. 22, 1890 |
| 659,513 | Dubus | Oct. 9, 1900 |
| 842,806 | McCausland | Jan. 29, 1907 |
| 877,934 | Lea | Feb. 4, 1908 |
| 894,498 | Hills | July 28, 1908 |
| 1,039,891 | Buchanan | Oct. 1, 1912 |
| 1,509,703 | Bourgeois | Sept. 23, 1924 |
| 2,700,826 | Rifner | Feb. 1, 1925 |